United States Patent
Rea

(10) Patent No.: US 7,255,208 B2
(45) Date of Patent: Aug. 14, 2007

(54) AIRCRAFT BRAKE WHEEL HEAT SHIELD

(75) Inventor: Samuel N. Rea, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/778,480

(22) Filed: Feb. 13, 2004

(65) Prior Publication Data

US 2005/0224634 A1    Oct. 13, 2005

(51) Int. Cl.
*F16D 65/84* (2006.01)

(52) U.S. Cl. ............... 188/264 G; 244/121; 244/100 R

(58) Field of Classification Search ........... 188/264 G, 188/264 A, 264 AA, 71.1, 71.4, 71.5, 71.6, 188/73.2, 218 XL, 18 A; 192/107 R, 107 M; 301/6.91, 61; 244/121, 100 R
See application file for complete search history.

(56) References Cited

U.S. PATENT DOCUMENTS

| | | | |
|---|---|---|---|
| 4,147,241 A | | 4/1979 | Han et al. |
| 4,326,610 A | | 4/1982 | Mouza |
| 4,363,355 A | * | 12/1982 | Prucyk ........................ 165/81 |
| 4,450,940 A | | 5/1984 | Herbulot |
| 4,569,600 A | * | 2/1986 | Preniczny et al. .......... 374/131 |
| 4,863,000 A | * | 9/1989 | Patel .......................... 188/170 |
| 4,889,959 A | * | 12/1989 | Taylor et al. ................ 174/351 |
| 5,107,968 A | | 4/1992 | Delpassand |
| 5,199,536 A | | 4/1993 | Clark |
| 5,236,249 A | | 8/1993 | Han et al. |
| 5,248,013 A | * | 9/1993 | Hogue et al. ........... 188/264 G |
| 5,671,827 A | * | 9/1997 | Demetriou et al. ......... 188/71.6 |
| 5,851,056 A | | 12/1998 | Hyde |
| 6,006,869 A | | 12/1999 | Rancourt et al. |
| 6,241,052 B1 | * | 6/2001 | Berwanger .................. 188/71.5 |
| 6,302,244 B1 | * | 10/2001 | Kernik et al. ............. 188/73.36 |
| 6,419,056 B1 | * | 7/2002 | Dyko et al. ............. 188/264 G |
| 6,698,385 B1 | * | 3/2004 | Lesage ...................... 122/13.01 |
| 6,935,835 B2 | * | 8/2005 | Della Mora ................. 415/119 |

FOREIGN PATENT DOCUMENTS

EP    0 555 822 A    8/1993
EP    1 304 240 A    4/2003

\* cited by examiner

*Primary Examiner*—Tien Dinh
(74) *Attorney, Agent, or Firm*—Birch, Stewart, Kolasch & Birch, LLP

(57) ABSTRACT

A perforated heat shield (20) is formed of a single layer and is implemented to be positioned between an aircraft brake assembly (34) and wheel assembly (28) in order to effectively protect the wheel assembly (28) and adjacent components from excessive thermal energy generated by an operation of the brake assembly (34) and to promote the cooling of the brake assembly (34) by allowing a partial amount of the thermal energy to radiate to the wheel assembly (28) through apertures (22) provided in the heat shield (20).

20 Claims, 4 Drawing Sheets

AIRCRAFT BRAKE WHEEL HEAT SHIELD

BACKGROUND OF THE INVENTION

1. Field of the Invention

The present invention relates to a heat shield for an aircraft, and in particular to a heat shield for an aircraft wheel and brake assembly.

2. Background of the Invention

Aircraft brakes operate on the basis of converting mechanical energy into thermal energy to stop an aircraft. Such braking operations generally result in the generation of significant heat within a brake disk stack, and the transfer of a significant portion of this heat to other components of the wheel and brake assembly.

FIG. 1 illustrates a conventional landing gear 1 that includes a strut 2 and a bogie beam 3. An axle 4 is provided on ends of the bogie beam 3. The axles 4 are each adapted to receive a wheel assembly 5 and a brake assembly 6. The brake assembly 6 includes a brake stack (not shown in FIG. 1) that has a plurality of alternating interleaved stator and rotor disks, the stator disks being affixed to the axle and the rotor disks being affixed to the wheel assembly. Brake actuation devices, such as pistons and return mechanisms, achieve a forceful inter-engagement of the rotor and stator disks in order to slow and stop the rotation of the wheel assembly. As such, the brake stack generates a considerable amount of heat energy that must be dissipated.

The successful development of carbon discs or carbon composite discs for aircraft brakes has significantly elevated the operating temperature of the wheel and brake assembly in contrast to steel discs. For example, modern aircraft brakes can attain a brake stack temperature of 1000-2000° F. after landing and taxiing into a gate. Thus, it is important to limit the heat transfer to the wheel assembly and the axle, in particular because excessive temperatures can damage the wheel, which loses strength at around 400° F.

Because of the high temperatures induced in the brake stack, heat shields are often used to thermally isolate the brake stack from the wheel assembly, bearings, pistons, axle, and other adjacent structures. In other words, these heat shields are used to prevent convection and radiation of heat energy to the wheel assembly that is generated by the brake stack. One skilled in the art recognizes that convection is defined as the transfer of heat energy through a medium by the circulation of currents from one region to another and that radiation is defined as the emission and propagation of heat energy in the form of rays or waves, which requires no medium for such transfer. In other words in order to radiate energy from one surface to another they must be able to see on another, e.g., there must be a direct line of sight.

FIG. 2 illustrates a conventional heat shield 7 that is provided between a brake stack 8 and the wheel assembly 5 in order to thermally isolate the wheel assembly 5 from the thermal energy (heat) that is generated by the brake stack 8 during a braking operation. These conventional heat shields 7 have a variety of configurations, however, they are commonly configured from two layers of sheet metal that have an insulating filler sandwiched between them.

These heat shields 7, however, produce an undesirable side effect in that the heat shields 7 retard heat loss from the brake stack 8. Thus, the brake stack 8 cools more slowly, thereby remaining at elevated temperatures. Such a complete blocking of the heat energy transfer is not desirable, as this leads to heat concentration in the brake stack 8, which can lead to premature failure under heavy-duty brake applications, for example, as in an abortive take-off. Furthermore, because the brake stack 8 remains at an elevated temperature, routine brake maintenance is hampered and thus departures of the aircraft from an airport gate are delayed.

U.S. Pat. No. 5,107,968 discloses a honeycomb open cell structure that limits the radiant and convection heat energy transfer from the aircraft brakes. These honeycomb heat shield structures are formed by stacking a plurality of stamped metal sheets onto one another, with each metal layer having their stamped sections being placed onto the next metal layer in an inverted fashion, thereby forming the open cell structure. By this configuration, a partial amount of radiant heat energy is transferred from the aircraft brakes to an aircraft wheel because there is a direct line of sight between the aircraft wheel and the aircraft brakes through the open cell structure of the honeycomb shield. This honeycombed shield structure, however, is thick, cumbersome, fragile, and expensive to manufacture.

Thus, there remains a need for heat shields that are configured to increase the cooling rate of aircraft brakes, are economical, durable, and are adapted to fit within the limited space provided between the brake assembly and the wheel assembly.

SUMMARY OF THE INVENTION

In one aspect, the present invention is directed to a perforated heat shield that is implemented to be positioned between an aircraft brake assembly and wheel assembly in order to effectively protect the wheel assembly and adjacent components from excessive thermal energy generated by an operation of the brake assembly and to promote the cooling of the brake assembly by allowing a partial amount of the thermal energy to radiate to the wheel assembly.

In another aspect, the present invention is directed to an aircraft landing gear that includes a wheel assembly having a wheel and a wheel tubewell, a brake assembly including a brake stack that has alternating stators and rotors. The brake assembly is attached to the wheel assembly and an axle of the aircraft landing gear. The aircraft landing gear also includes a heat shield that is provided between the wheel assembly and the brake assembly, and has a plurality of apertures formed across a surface of the heat shield.

In a further aspect, the present invention is directed to a method of cooling an aircraft brake assembly. The method includes the steps of providing a heat shield with a plurality of apertures therein, whereby the apertures are formed to be staggered across the heat shield, and providing the heat shield between the aircraft brake assembly and an aircraft wheel assembly. The aircraft brake assembly includes alternating stators and rotors and the aircraft wheel assembly includes a wheel tubewell and a wheel. The apertures of the heat shield enable direct thermal radiation to pass from the aircraft brake assembly to the aircraft wheel assembly to thereby promote cooling of the aircraft brake assembly on the basis of an amount of radiated thermal radiation.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
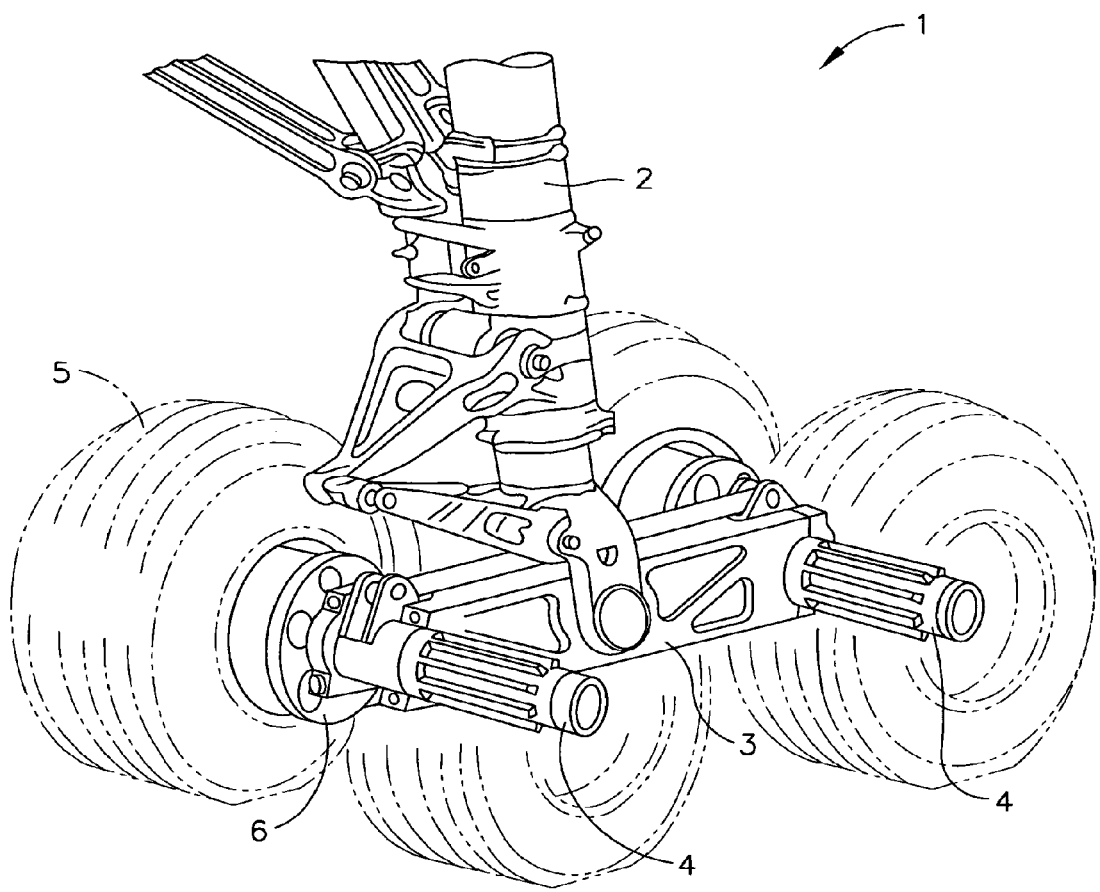
FIG. 1 is an illustration of an aircraft landing gear.
Figure 2:
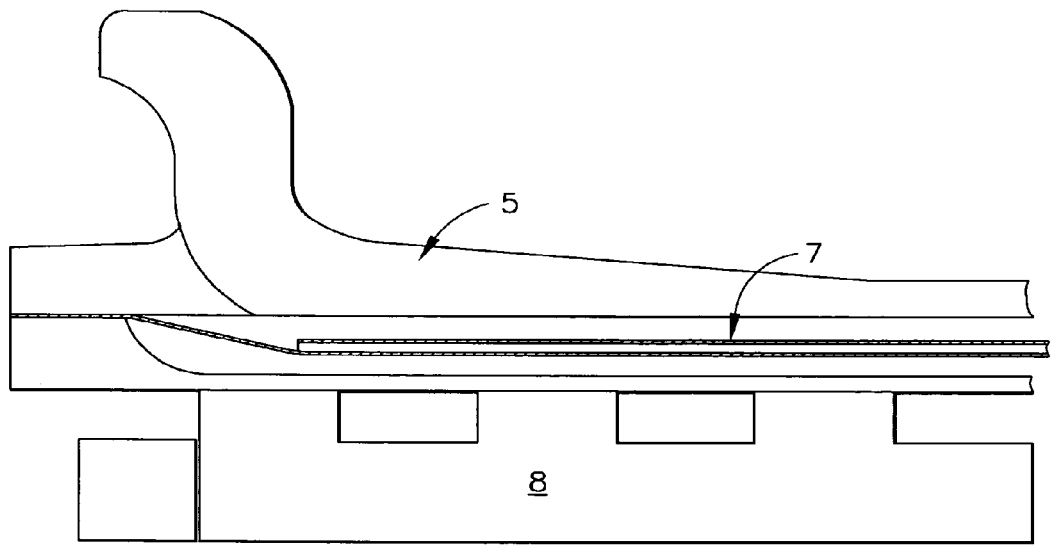
FIG. 2 is an illustration of a conventional heat shield provided between a wheel assembly and a brake stack.
Figure 3:
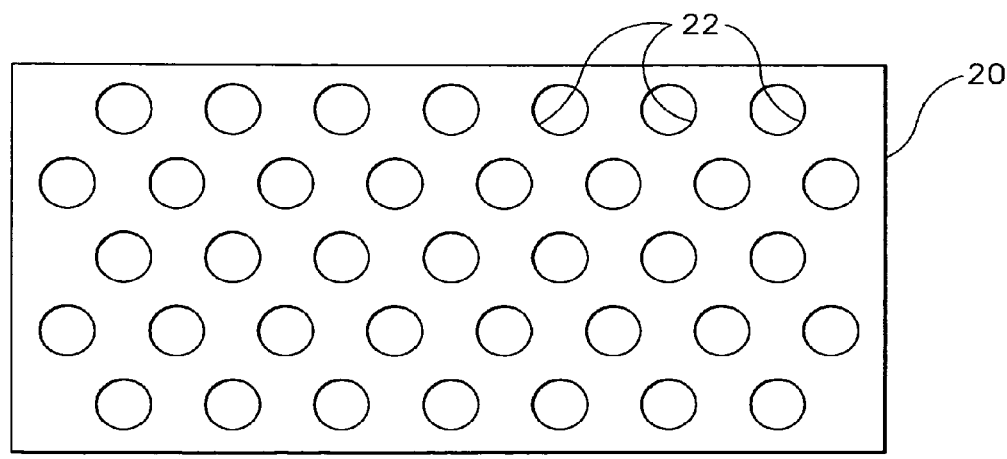
FIG. 3 is a plan view of a heat shield according to a preferred embodiment of the present invention.

Referring now to the drawings and more particularly to FIG. 3, a heat shield 20 according to a preferred embodiment of the present invention is shown in plan view. The heat shield 20 is provided with a plurality of apertures 22 to thus perforate the heat shield 20. The heat shield 20 is formed from a single layer of a high temperature resistant composition, for example, metal, ceramics, etc.

The perforation pattern shown in FIG. 3 has a 60°-staggered pattern with ⅛" apertures 22 on 0.25" centers, thus yielding a 33 percent open area. This percentage of perforated area also correlates to a percentage of a weight reduction in the heat shield 20, which is an extremely desirable attribute for an aircraft. One skilled in the art should appreciate that the heat shield 20 can have any number of hole sizes and patterns. For example, the apertures 22 can be circular, diamond shaped, rectangular, slotted, etc., a key parameter being the percent of perforated area with respect to the non-perforated area. The apertures 22 can be dimpled but, preferably, extend completely through the heat shield 20.

Figure 4:
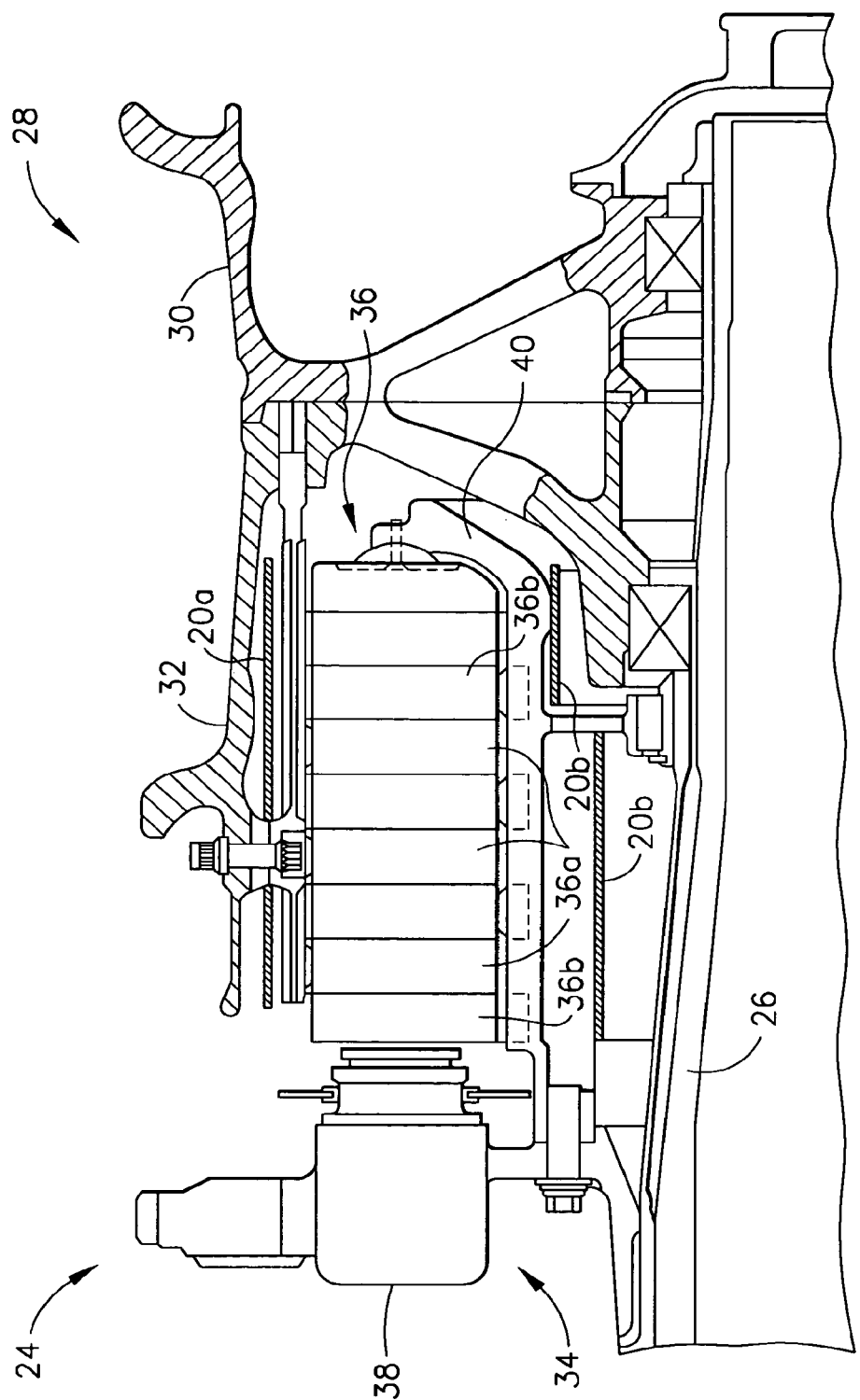
FIG. 4 is a partial section view of an aircraft landing gear having the heat shield of the present invention provided therein.

FIG. 4 is a partial section view of an aircraft landing gear 24 having the heat shield 20 of the present invention provided therein. The aircraft landing gear 24 includes an axle 26 that is adapted to receive a wheel assembly 28, which includes a wheel 30 and a wheel tubewell 32. A brake assembly 34 includes a brake stack 36 that has alternating interleaved rotors 36a and stators 36b. The rotors 32a are attached to the wheel assembly 28 and the stators 36b are attached to the axle 26 via a torque tube 40. The brake assembly 34 further includes a brake piston 38, which, during a braking operation causes the rotors 36a and the stators 36b of the brake stack 36 to engage with one another. This process converts mechanical rotating energy of the wheel assembly 28 into thermal energy, e.g. heat, which, as stated above, can cause the brake stack 36 to reach temperatures of 1000-2000° F., and in extreme braking situations the temperature of the brake stack 36 can exceed 2500° F.

Thus, in order to protect the wheel assembly 28, the axle 26, components of the brake assembly 34, and other adjacent components (not shown), from the generated thermal energy, heat shields 20a-b are provided to be adaptively mounted within the aircraft landing gear 24, specifically, between the wheel assembly 28 and the brake assembly 34.

Wheel heat shield 20a is provided between the wheel assembly 28 and the brake stack 36. Axle heat shield 20b is provided between the axle 26 and the brake stack 36. The wheel heat shield 20a and the axle heat shield 20b are each formed so as to be cylindrical and can each be formed in sections that are hinged together in a known fashion. These hinged sections enable uncomplicated replacement of a damaged section or can be easily removed for maintenance purposes.

The apertures 22 of the wheel heat shield 20a allow radiated thermal energy that is generated by the brake stack 36 during a braking operation to be partially absorbed by the wheel assembly 28. It should be recognized that the axle heat shield 20b can be provided with apertures.

The apertures 22 not only allow direct thermal radiation to the wheel assembly 28, but also enhance convection cooling in the limited space provided between the wheel assembly 28 and the brake assembly 34 by allowing air to flow through the apertures 22 of the perforated heat shield 20 in contrast to the conventional non-perforated heat shields, which decrease the effective amount of air flow between the wheel assembly 28 and the brake assembly 34.

The present invention realizes that modern large aircraft wheel assemblies weigh on the order of 200 lbs and as such, this wheel mass provides a considerable heat sink. Thus, the wheel assembly 28 promotes the cooling of the brake stack 36 via the apertures 22 of the wheel heat shield 20a. As stated above, the apertures 22 can have any size or pattern, and as such, it is possible to tailor the amount of thermal energy that is radiated to the wheel assembly 28 from the brake stack 36 for specific applications. In other words, the amount of heat that the wheel assembly 28 absorbs can be controlled. The perforated heat shield 20 can also be mated completely or partially with a non-perforated heat shield in order to further tailor the amount of thermal energy that is radiated and/or absorbed by the wheel assembly 28.

Figure 5:
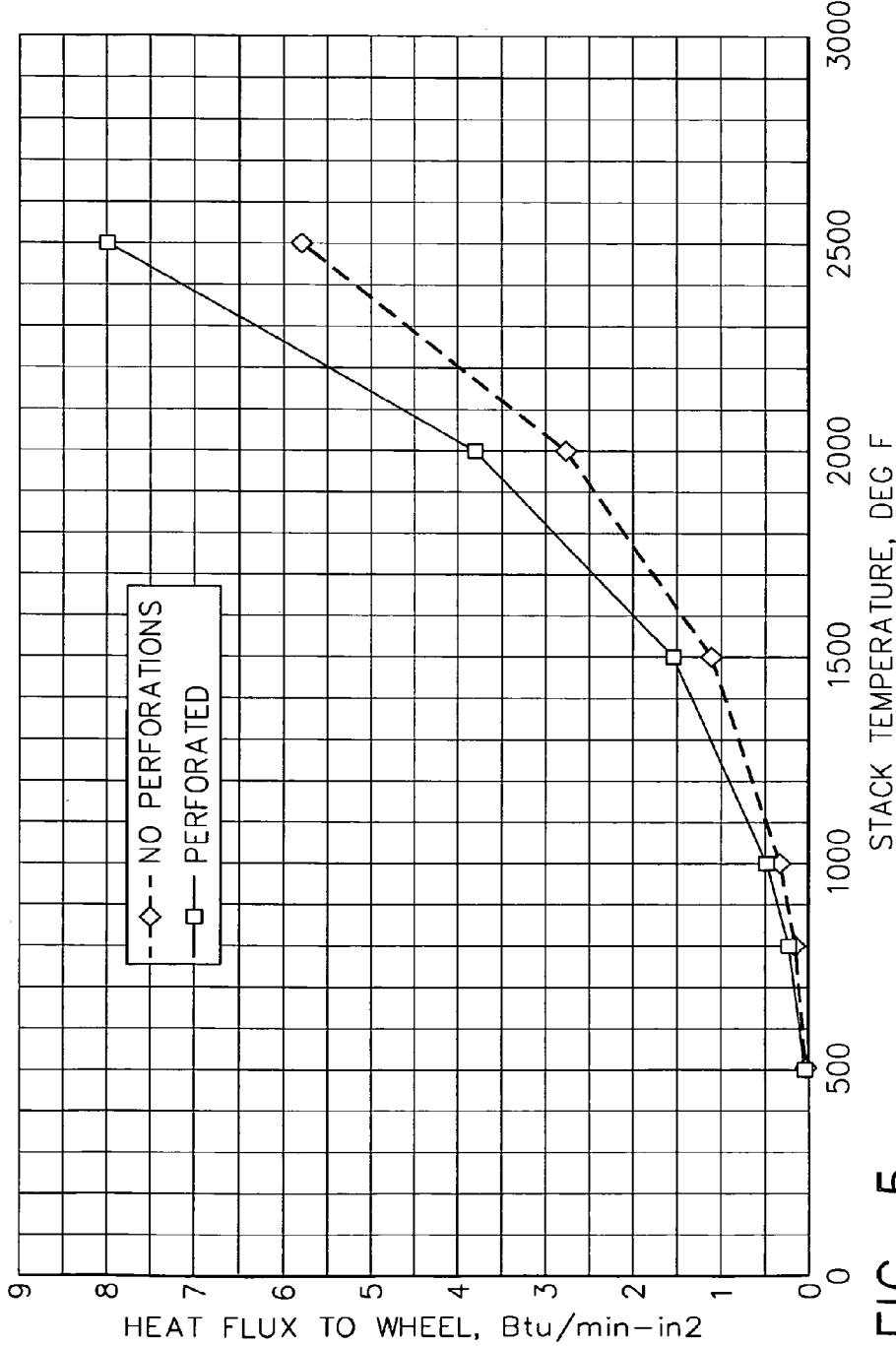
FIG. 5 is a graph depicting a comparison of a heat flux from a brake assembly to a wheel assembly of a conventional heat shield and the heat shield according to a preferred embodiment of the present invention.

FIG. 5 is a graph depicting a comparison of a heat flux from the brake assembly 34 to the wheel assembly 28 of a conventional heat shield (non-perforated) and the heat shield 20 according to a preferred embodiment of the present invention. As can be seen from FIG. 5, the perforated heat shield 20, which has an open area of approximately 33 percent due to the configuration of the apertures 22, results in a 20-40 percent increase in thermal radiation energy flux over the non-perforated conventional heat shield, thus promoting cooling of the brake stack 36.

What is claimed is:

1. A heat shield and an aircraft landing gear that includes a wheel assembly having a wheel and a wheel tubewell and a brake assembly having stators and rotors alternating along a length direction of a wheel assembly axle, the heat shield being formed of a single layer and being provided with a plurality of apertures formed across a surface thereof, along said length direction, thereby creating a pattern of direct line-of-sight regions from said alternating stators and rotors to said wheel assembly for allowing direct thermal radiation from the alternating stators and rotors to the wheel assembly, wherein said heat shield is dimensioned and shaped for positioning between the alternating stators and rotors and the wheel assembly of the aircraft.

2. The heat shield according to claim 1, wherein the heat shield is formed of metal.

3. The heat shield according to claim 1, wherein the heat shield is formed cylindrically, such that a plurality of apertures are formed along said length direction and around the cylindrical shape of said heat-shield.

4. The heat shield according to claim 1, wherein the plurality of apertures extend through the heat shield.

5. The heat shield according to claim 1, wherein the heat shield is positioned between the brake stack and the wheel assembly.

6. The heat shield according to claim 1, wherein the heat shield is formed of a plurality of sections that are removably attached to one another in order to form a cylindrical heat shield.

7. The heat shield according to claim 1, wherein the apertures are circular.

8. The heat shield according to claim 1, wherein the apertures are formed to be in a staggered pattern on the heat shield.

9. The heat shield according to claim 1, wherein the heat shield has approximately a 33 percent open area.

10. The heat shield according to claim 1, wherein the direct thermal radiation from the brake stack to the wheel assembly though the apertures of the heat shield promote cooling of the brake stack during a braking operation.

11. An aircraft landing gear comprising:
a wheel assembly having a wheel and a wheel tubewell;
a brake assembly including a brake stack that has alternating stators and rotors, the brake assembly being attached to the wheel assembly and an axle of the aircraft landing gear, said stators and rotors alternating along a length direction of said axle; and
a heat shield being provided between the wheel assembly and the brake assembly, the heat shield having a plurality of apertures formed across a surface thereof, along said length direction, thereby creating a pattern along said length direction of direct line-of-sight regions from said alternating stators and rotors to said wheel assembly for allowing direct thermal radiation from the alternating stators and rotors to said wheel assembly.

12. The aircraft landing gear according to claim 11, wherein the plurality of apertures of the heat shield allow thermal radiation to pass from the brake assembly to the wheel assembly in order to promote cooling of the brake assembly.

13. The aircraft landing gear according to claim 12, wherein the thermal radiation passes from the brake assembly to the wheel tubewell.

14. The aircraft landing gear according to claim 12, wherein an amount of thermal radiation that is passed from the brake assembly to the wheel assembly is determined on the basis of a percentage of open area formed by the apertures.

15. The aircraft landing gear according to claim 11, wherein an axle heat shield is provided between the brake assembly and the axle.

16. The aircraft landing gear according to claim 15, wherein the axle heat shield has a plurality of apertures.

17. The aircraft landing gear according to claim 11, wherein the heat shield is formed to be cylindrical, such that a plurality of apertures are formed along said length direction and around the cylindrical shape of said heat shield.

18. The aircraft landing gear according to claim 11, wherein the heat shield is formed of a single layer.

19. The aircraft landing gear according to claim 11, wherein the apertures promote convection cooling between the wheel assembly and the brake assembly.

20. The aircraft landing gear according to claim 11, wherein the apertures are formed to be in a staggered pattern on the heat shield.

* * * * *